United States Patent [19]

Linnersten

[11] Patent Number: 5,098,767
[45] Date of Patent: Mar. 24, 1992

[54] FILTER DEVICE WITH MICROPLEATS AND MACROPLEATS

[75] Inventor: Staffan B. Linnersten, New Port Richey, Fla.

[73] Assignee: Pall Corporation, Glen Cove, N.Y.

[21] Appl. No.: 670,522

[22] Filed: Mar. 18, 1991

Related U.S. Application Data

[63] Continuation of Ser. No. 310,531, Feb. 15, 1989, abandoned.

[51] Int. Cl.$^5$ .................. B01D 39/08; B01D 46/10; B32B 3/28
[52] U.S. Cl. .................... 428/182; 428/181; 428/184; 428/213; 428/215; 428/220; 428/228; 428/251; 428/252; 428/288; 428/296; 428/311.5; 428/343; 428/349; 428/435; 428/477.7; 55/497; 55/499; 55/500; 55/501; 55/521; 55/97; 210/493.5
[58] Field of Search .............. 428/181, 182, 184, 213, 428/215, 220, 228, 251, 252, 288, 296, 311.5, 343, 349, 435, 477.7; 210/493.5; 55/97, 497, 499, 500, 501, 521

[56] References Cited

U.S. PATENT DOCUMENTS

| | | | |
|---|---|---|---|
| 2,013,038 | 9/1935 | Dollinger | 55/501 X |
| 2,471,548 | 5/1949 | Schaat | 55/497 |
| 2,915,426 | 12/1959 | Poelman | 55/500 X |
| 2,980,208 | 4/1961 | Neumann | 183/71 |
| 3,189,179 | 5/1965 | McMichael | |
| 3,194,401 | 7/1965 | Banker | 210/444 |
| 3,216,578 | 11/1965 | Wright et al. | 210/493.5 X |
| 3,243,943 | 4/1966 | Getzin | 428/181 X |
| 3,246,767 | 4/1966 | Pall et al. | 55/521 X |
| 3,407,252 | 10/1968 | Pall et al. | 210/493.5 X |
| 3,442,388 | 5/1969 | Pall | 210/321 |
| 3,448,862 | 6/1969 | Kudlaty | 210/489 |
| 3,490,211 | 1/1970 | Cartier | 55/487 |
| 3,631,582 | 1/1972 | Lucas et al. | 29/419 |
| 3,692,184 | 9/1972 | Miler, Jr. et al. | 210/437 |
| 3,871,851 | 3/1975 | Neumann | 55/500 X |
| 3,937,663 | 2/1976 | Bessiere | 210/493 R |
| 4,129,429 | 12/1978 | Humbert, Jr. et al. | 55/484 |
| 4,135,900 | 1/1979 | Westlin et al. | 55/499 |
| 4,225,328 | 9/1980 | Stiehl | 55/378 |
| 4,323,374 | 4/1982 | Shinagawa et al. | 55/132 |
| 4,331,459 | 5/1982 | Copley | 55/302 |
| 4,359,330 | 11/1982 | Copley | 55/273 |
| 4,386,948 | 6/1983 | Choksi et al. | 55/499 |
| 4,460,388 | 7/1984 | Fukami et al. | |
| 4,652,285 | 3/1987 | Greene | |
| 4,738,778 | 4/1988 | Taki et al. | 210/493.1 |
| 4,746,432 | 5/1988 | Taki et al. | 210/493.5 |

FOREIGN PATENT DOCUMENTS

| | | |
|---|---|---|
| 0206336 | 12/1986 | European Pat. Off. ......... 210/493.5 |
| 2739815 | 9/1978 | Fed. Rep. of Germany . |
| 2477031 | 9/1981 | France . |
| 602157 | 7/1978 | Switzerland . |
| 880427 | 10/1961 | United Kingdom . |
| 2020995 | 11/1979 | United Kingdom . |
| 2071721 | 9/1981 | United Kingdom . |

OTHER PUBLICATIONS

"Advance in HEPA Filter Design" Filtration and Separation; vol. 24, No. 6, (144th Issue).
"Performance Limitations of HEPA Filters at High Temperatures", 20th DOE/NRC Nuclear Air Cleaning Conference.

Primary Examiner—Ellis P. Robinson
Assistant Examiner—William P. Watkins, III
Attorney, Agent, or Firm—Leydig, Voit & Mayer

[57] ABSTRACT

A high efficiency air filter is described which comprises a depth filter sheet that has been formed with micropleats stabilized by application of a strip of a thermoplastic adhesive across the peaks of the micropleats and then formed into a macropleated structure with the axes of the micropleats and the macropleats being essentially parallel. The micropleats preferably have a bending radius of less than about 0.01 inch.

35 Claims, 3 Drawing Sheets

FILTER DEVICE WITH MICROPLEATS AND MACROPLEATS

This application is a continuation of application Ser. No. 07/310,531, filed Feb. 15, 1989, now abandoned.

The present invention relates to filters and more particularly to high efficiency filters designed to remove particulate matter, including aerosol droplets, from gases such as air.

BACKGROUND OF THE INVENTION

Recent trends in transportation and industry have placed greater emphasis and demands on air filtration as a means of removing contaminants from the environment. The increase in the proportion of recirculated air in newer commercial passenger planes has raised concerns over increased levels of airborne bacteria and viruses in the working environment of air crews.

It has been well established that viable microorganisms can exist in aerosols and can be spread by aerial transport through air circulating systems. These organisms can remain airborne and viable for considerable lengths of time The survival times will depend on the specific organisms and the relative humidity in the environment. It is reasonable to surmise that a significant percentage of microorganisms in aerosol form will survive through the period of commercial passenger flights.

When considering the air filtration requirements for any application, it will be helpful to have a working knowledge of how air filters work and how they are tested and rated. Air filters usually have to deal with the filtration of particles of from 0.01 micrometers ($\mu$m) and up. For reference, a micrometer is equal to 0.000039 inch and the smallest particle which can be seen by the unaided eye is 40 $\mu$m,. Typical viruses and the finest cigarette smoke are on the order of 0.01 $\mu$m, particle size. The typical droplets in a cloud or fog are 10 $\mu$m,.

The three mechanisms by which particles are removed from a gas stream by a filter are direct interception, inertial impaction, and diffusional interception.

Direct interception is the simplest and most easily understood mechanism. The filter medium consists of fiber matrices with defined openings or pores through which the air passes. If the particles in the air are larger than the pores they will be removed by direct interception at the pores.

Filters can also remove particles which are smaller than the filter pore size by inertial impaction. As the air flows around the individual fibers of the filter medium, particles which are of higher density will deviate from the air flow path and impact upon the fibers. The impacted particles adhere to the fibers by forces such as Van der Waals' forces while still being acted upon by forces from the air flow. Larger particles have a higher probability of impaction, but are also subject to larger aerodynamic forces which may overcome the adhesive forces and pull them away from the fibers.

In practice, with considerable variation due to differing particle densities and prevailing flow rates, particles larger than about 0.5 $\mu$m, and smaller than about 2-10 $\mu$m, will impact and be retained on the fiber surface. Particles smaller than about 0.3 to 0.5 $\mu$m, diameter will not impact the fibers and will not be removed efficiently by this mechanism.

The molecules of gases are in constant motion in random directions. Very small particles which are suspended within the gas will be impacted by the moving molecules causing the particles, in turn, to move in a random fashion. Such motion is called "Brownian motion".

Brownian motion will cause small particles to deviate from air stream lines in a manner quite different from the inertial effects described previously for larger particles. These random particle excursions will cause the particles to be collected on the individual filter fibers by the mechanism called diffusional interception. In practice, particles smaller than about 0.1 to 0.3 $\mu$m, are efficiently removed by this mechanism.

All gas filters combine all three mechanisms of direct interception, inertial impaction, and diffusional interception to some degree. If the efficiency of removal of a typical filter is measured as a function of particle size, a minimum efficiency will be observed for particles of about 0.3 $\mu$m diameter with higher efficiencies for both smaller and larger particles. This behavior results from the following factors 1. Diffusional interception causes high removal for particles below about 0.1 $\mu$m, but decreases rapidly for particles which are larger.

2. Below 0.5 $\mu$m, removal efficiency due to inertial impaction is low. This combined with the fall off in diffusional interception above 0.1 $\mu$m, causes the removal efficiency to be lowest about 0.3 $\mu$m,. Generally speaking, efficiency is at a minimum between 0.2 and 0.4 $\mu$m.

3. Above 0.5 $\mu$m, up to 2-10 $\mu$m,, inertial impaction and adhesion is high and the removal efficiency increases.

4. In the size range above 2-10 $\mu$m, a typical filter medium provides essentially 100% removal by direct interception.

The removal efficiency of a given filter medium is dependent on several variables including particle size, flow velocity, and medium thickness. The effects of particle size have been discussed. In summary, it can be said that for any given filter medium and flow conditions there is some most-penetrating particle size at which the efficiency is at a minimum. The efficiency will be higher for particle sizes which are larger or smaller than the most-penetrating size.

The effect of flow velocity on particle removal is different depending on the filtration mechanism. An increase in velocity will improve the capture of particles by inertial impaction because the inertial effects which deviate particles from the air flow stream lines are increased. The effect is to extend the regime of this mechanism to smaller particle sizes. In the very small particle size regime where diffusion interception is the predominant removal mechanism, an increase in velocity will decrease removal efficiency. As the residence time in the filter medium is decreased, the probability of interception due to random particle motion is decreased. The net effect of increasing flow velocity through a filter medium will be a decrease in the minimum efficiency and a decrease in the most-penetrating particle size.

The removal efficiency of a filter medium for a given particle size can be increased by increasing the thickness of the filter medium. For example, a filter medium may have a 90% efficiency when challenged by 0.3 $\mu$m, particles; that is, 10% of the incident particles pass. If we add a layer of medium, that layer will remove 90% of the incident 10%; that is, 1% of the total will pass. The total efficiency of the two layers is 99%. By adding additional layers the efficiency would become 99.9%, 99.99%, etc. The same effect as adding layers can be achieved by making the medium in a single layer but of multiple thickness. For air filtration, very high efficiencies for 0.3 $\mu$m, particles can be achieved using a filter medium with a pore diameter many times larger than 0.3 $\mu$m, by making the filter medium with sufficient thickness.

Higher efficiencies can also be achieved by making a filter medium with smaller pores. Smaller pore size enhances the probability of removal by all three mechanisms and for all particle sizes.

The same variables also affect the flow resistance or pressure drop through the filter medium. Increasing the flow velocity and/or medium thickness will also increase the pressure drop through the medium as will decreasing the pore size of the medium. Since the pressure drop which can be tolerated across the filter is limited in most blown air systems, all these variables and their net affects must be considered in designing or selecting a filter for a specific application.

The performance of high efficiency air filters is generally reported as the percentage of influent particles which are removed by the filter. From the above discussions it can be seen that, to be meaningful, the reported efficiency must be related to particle size and flow velocity. When rating or specifying filter media a flow velocity is normally selected for test. This velocity should be within the range in which it would be used in a filter assembly. For assembled filters the efficiency is normally reported at the rated flow of the filter which relates directly to the average velocity over the face of the filter.

Ideally, removal efficiency of a filter would be reported as a continuous function of particle size. This would require costly testing as it is difficult to generate and measure aerosols of a specific size. Another approach is to measure and report the minimum efficiency of a filter for the most-penetrating particle size. This approach has been taken to define the class of filters designated HEPA (High Efficiency Particulate Air). Although the term HEPA is often used to designate any high efficiency air filter, it is specifically defined as an air filter having a minimum efficiency of 99.97% for 0.3 $\mu$m, particles of monodispersed dioctylphthalate (DOP). The 0.3 $\mu$m, particle size was selected because it is in the range of the generally accepted most-penetrating particle size for filters of this type as discussed previously.

The most definitive way to describe the performance of a filter is to state its removal efficiency for a specific particle size or test aerosol. The test aerosol specified for HEPA filters is monodispersed dioctylphthalate (DOP). This aerosol, sometimes referred to as thermally generated DOP, is formed by condensing DOP oil vapor which has been generated by heating. The resulting aerosol has a mean particle size of 0.3 $\mu$m,. In a filter test the aerosol concentration is measured both upstream and downstream of the filter using forward light scattering techniques.

Field or leak testing and some performance testing is conducted using polydispersed or heterogeneous DOP aerosol. This aerosol is generated by passing compressed air through a specifically designed nozzle which has been placed in a DOP oil bath. The resulting aerosol contains a range of particle sizes from less than 0.3 to 3.0 $\mu$m, with a mean size at about 0.7 $\mu$m,.

In recent years there have been significant innovations in filter design. Initially, filters were not much more than surface filters that had limited dirt capacity before becoming "blinded". These often required significant pressure to force the air through the filter, a pressure that increased significantly with use because of the blinding effect. Of course, increased pressure often led to filter rupture and, even where this was not the case, required powerful impeller motors that were expensive to run and often noisy.

In addition, the filters themselves became bulky because increased throughput could only be achieved by an increase in surface area of the filter.

The development of fiber matrix filters, sometimes called depth filters, greatly increased the dirt capacity of filters. The utility and mode of operation of such filters has been discussed at length above.

The second major development was the construction of filter assemblies in which the filter medium is pleated so that the particulate-containing air contacts a much greater filter surface area for a given unit size. In some devices this idea has been taken further to provide corrugated sheet filters that are then pleated to increase even further the superficial filtering surface presented to the air flow.

One of the most demanding filtration applications has been the filtration of cabin air in airplanes. The design specifications for such filters require a very low pressure drop across the filter, i.e., low resistance to passage of the air, high efficiency of filtration, and very long service intervals. It would be easy to provide a low pressure drop, if lower efficiency would be acceptable. This is not, however, the case. Low pressure drop is nevertheless very important so as to reduce noise and power requirements for the air circulation system. By the same token, it is unacceptable to have relatively dirty air recycled.

Filtration of airplane cabin air is a particularly difficult filtration application since the air often contains significant amounts of fibrous material from carpets, seat fabrics, passenger clothes, and so on. These fibers tend to collect on the upstream surface of a filter and blind the surface of the filter causing an increase in the pressure drop across the filter. With conventional filters it has often proved necessary to install a pre-filter to remove such fibrous matter. This leads to a further maintenance problem in that a mechanic may replace a blinded pre-filter and not recognize that the dirt capacity of the filter itself is close to being reached. As a result, a second maintenance event will be needed within a relatively short time.

The present invention relates to high efficiency air filters having particular design features which permit an unexpectedly small pressure drop across the filter without sacrifice of efficiency or service life. This became possible following the discovery that a fibrous depth filter could be constructed that has the dimensional stability and high filtration efficiency in a very compact form combined with a very low pressure drop across the filter. With this new discovery it has proved possible to design highly efficient air filters capable of meeting the most demanding standards of the aircraft designers while permitting at the same time the elimination of prefilters for the interception of airborne fibers.

SUMMARY OF THE INVENTION

The present invention provides a filter assembly comprising a frame which defines a flow path from an inlet side to an outlet side and a filter which is disposed within the frame across the flow path. The filter includes a sheet having micropleats wherein the bending radium of the micropleats is less than the critical radius. The micropleated sheet defines macropleats.

The present invention also provides a filter assembly comprising a frame which defines a flow path from an inlet side to an outlet side and filter which is disposed within the frame across the flow path. The filter is formed from a sheet of filter material and is formed into micropleats. At least one strip of adhesive material is applied across the peaks of the micropleats and the micropleated sheet defines macropleats.

The term "macropleat" is used herein to refer to pleats having a depth of at least 2 inches and "micropleats" have a depth that is less than about 1 inch. In any specific structure having both micro and macropleats, the depth of the macropleat is at least 6 and preferably at least 8 times that of the micropleat.

The design of the highly efficient filters of the invention has as an object the minimization of the pressure drop across the filter when in use. The understanding of how this has been achieved requires an understanding of the factors involved in making up the total pressure drop ($P_t$) across a filter. It has now been found that this is the sum of several factors:

$P_m$—the media pressure drop that depends on the nature of the filter medium (voids volume, fiber dimensions, etc.) and the air flow velocity;

$P_d$—the dirt factor. As dirt builds up in a filter it will provide its own resistance to flow as a result of the blinding of air flow passages or the reduction of their dimensions;

$P_g$—the geometric factor which depends on the geometry of the filter medium, e.g., the width of the pleats, if the filter medium is formed into V-pleats;

$P_e$—the exit factor. As air exits the filter through relatively narrow individual passageways into the exit manifold, there will be an expansion and a consequent pressure drop; and $P_c$—the configuration factor which depends in part on the number, size, and shape of the micropleats.

It has now been found that $P_c$ is critically dependent upon the "bending radius" ("R") of the micropleats. The bending radius is the radius of an imaginary circle that may be drawn based upon an arc coinciding with the inner surface of the root of one of the micropleats in the filter medium. In fact, if all other variables are kept constant, $P_c$ is inversely proportional to $(K-R)^3$ where K is a constant. If now all design and test conditions are held constant except for R and a graph is plotted of total pressure drop, $P_t$, against the bending radius (R), the result is a graph with a shape similar to that of the graph presented as FIG. 2. This graph has an inflection point, "X", and the value of "R" at that point is defined as the "critical radius". Above that critical radius, the total pressure drop increases very rapidly. Below it, a relatively steady pressure drop is observed. Thus, if all other design factors are held constant, the key to obtaining the lowest possible pressure drop over the filter is to ensure that the micropleats have a bending radius that is less than the critical radius.

The actual size of the critical radius depends on a number of factors as has been indicated above but for preferred micropleat and macropleat geometries, it will generally be less than about 0.015 inch and more usually below about 0.01 inch.

The air filter of the invention is a variety of a depth filter and, therefore, comprises a fibrous sheet in which particulate matter is trapped as it passes along a tortuous path defined by the fibers in the sheet.

The depth filter itself is in the form of a sheet having a thickness of up to 0.03 inch and preferably from 0.01 inch to 0.02 inch, for example about 0.015 inch. This layer is micropleated, that is to say, it has imposed upon it a generally repeating V-shaped configuration. The depth of the micropleats, (that is the vertical distance between imaginary lines connecting the peaks and the roots of the pleats), is usually from about 10 to 100 times the thickness of the sheet. Generally, therefore, this means that the depth is from 0.1 inch up to 1.0 inch, although preferably depths of between 0.3 inch and 0.5 inch, such as about 0.35 inch are preferred. The micropleats, therefore, are preferred to be quite shallow.

The bending radius of the roots of the micropleats in the sheet is preferably less than about 0.01 inch such as, for example, 0.005 inch. Clearly, there are limitations on the lower limit of the radius that are raised by practical rather than theoretical concerns. It is, however, important that, above a bending radius of more than the critical radius, the pressure drop experienced over the filter rises significantly in the most unexpected fashion. This is illustrated clearly with reference to the graph shown in FIG. 2, (discussed below).

The filters of the invention have a particular dimensional stability as a result of their mode of construction. It is a feature of the invention that, after the depth filter sheet is micropleated, a strip of thermoplastic polymer is laid in straight lines across the peaks of the micropleats on the upstream (in use) side of the micropleated sheet and allowed to set. Preferably, this treatment is repeated on the other side.

After formation of the micropleats, the depth filter is macropleated along axes parallel to the axes of the micropleats. Thus, a cross-section showing the shape of the micropleats will also show the shape of the macropleats. The bottom of the macropleats and also the top are formed by a straightening out of the micropleats and it is a preferred feature of the invention that the bottom of the macropleat is wider. Thus, if the filter sheet can be said to present two faces each comprised of a series of V's, (ignoring the micropleats for the moment), the V's on the inlet side of the sheet are more widely separated than the legs of the V's on the outlet side. It is found that this configuration contributes significantly to extending the service intervals for filters of the invention. However, where the lowest possible clear pressure drop is desired, the spacing of the V's can be symmetrical or even longer on the outlet side than on the inlet side.

DESCRIPTION OF THE DRAWINGS

In FIG. 4 and in FIG. 5, (which is a perspective view with a cross-section cutaway position), a frame comprising an inlet, an outlet and a rectangular frame member, 1, having impervious side walls, holds a micropleated and macropleated fibrous depth filter medium, 2, resting on in-turned frame edge members, 3. Additional support is provided by a support member, 4, which comprises a sheet of the dimensions of the outlet face of the filter resting on the in-turned edges, 3, of the frame member and having slots, 5, cut therein, said slots being positioned beneath the upturned V's of the macropleats of the filter on the outlet side.

Figure 1:
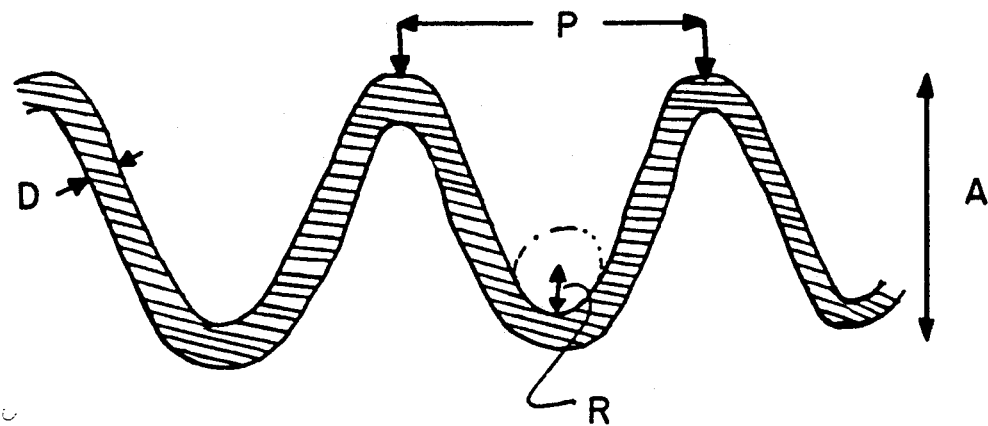
FIG. 1 is a schematic cross-section of one of the micropleats in a filter sheet according to the invention. The dimension represented as "A" is referred to as the depth. The dimension referred to as "P" is the pitch. However, the most important dimension for the efficiency of the filter sheets of the invention is the dimension referred to as "R". As will be perceived, "R" is the "bending radius", that is, the radius of the imaginary circle having an arc that corresponds to the root of a micropleat in the sheet. The fourth dimension indicated in the drawing is "D", which is the thickness of the sheet.
Figure 3:
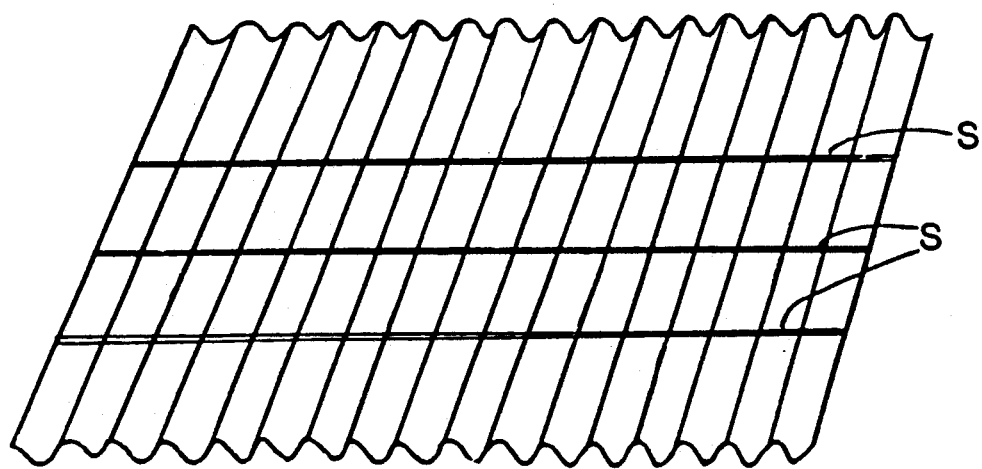
FIG. 3 is a schematic perspective view of a preferred form of a micropleated high efficiency air filter according to the invention before macropleats are formed on it. Strips ("S") of hot melt adhesive are applied to the upper surfaces of the micropleats at right angles to the axes of the micropleats. Similar strips are applied on the opposed surface of the sheet as represented. This novel treatment serves to hold the micropleats in position in use.
Figure 2:
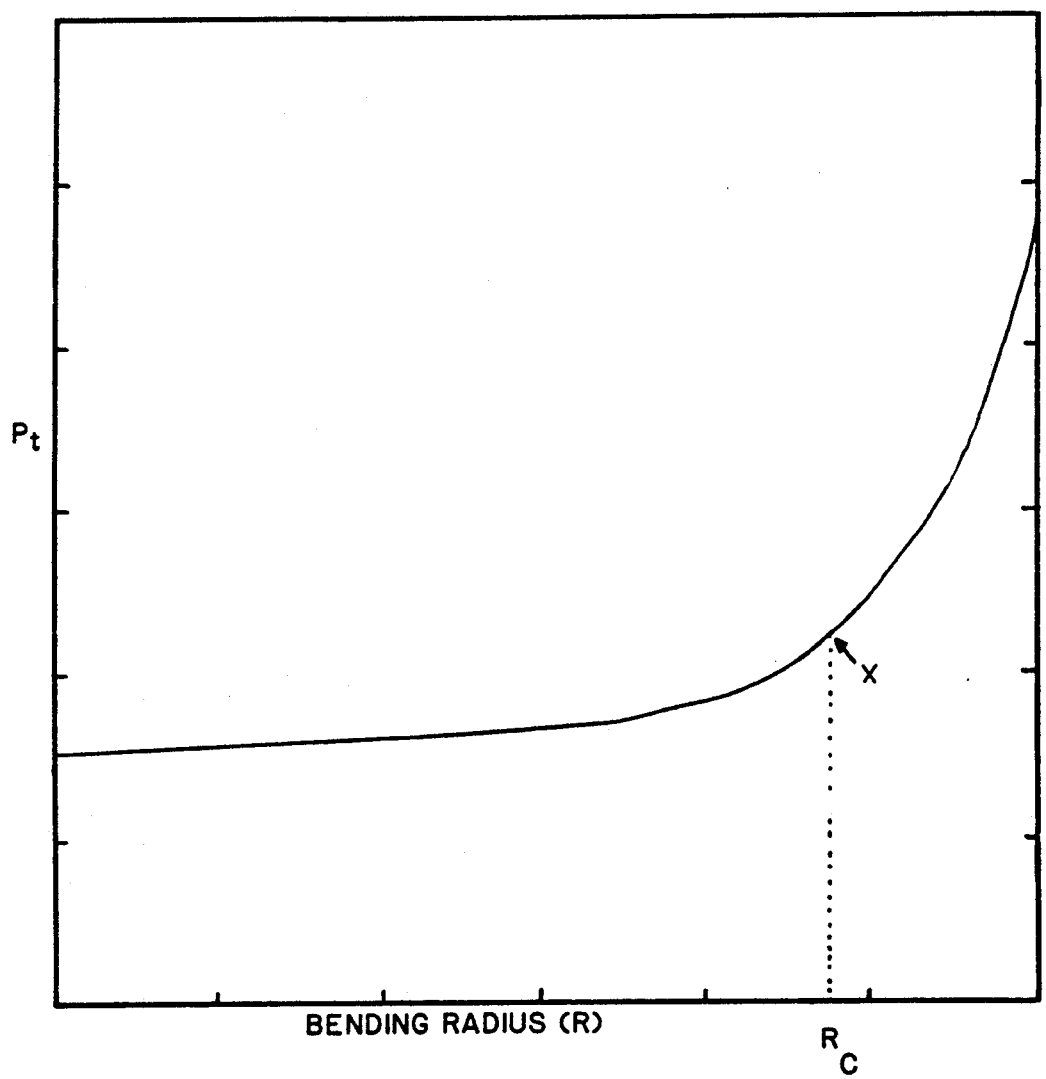
FIG. 2 is a graph, one coordinate of which is $P_f$, that is, the difference in pressure between the inlet face and the outlet face of a specific (clean) filter according to the invention at a constant average air flow velocity through the filter medium of about 6 feet/minute. $P_f$ is measured in inches of water column. The other coordinate is the bending radius of the micropleat in the sheet measured in inches. As will be seen, above a certain bending radius, called the critical radius, the $P_f$ increases dramatically. It is for this reason that it is preferred that the bending radius of the micropleats in the filter sheets of the invention is not greater than the critical radius.

The invention is now described with reference to a preferred embodiment which corresponds generally to that described in the drawings. At the same time a method is described for making the filters of the invention that is exemplary of a further aspect of the invention.

In a preferred filter according to the invention, a fibrous, depth filter sheet of entangled glass fibers is supported on a porous web of spun-bonded nylon continuous filaments. The combined thickness of the filter sheet and web is 0.015 inch. This composite sheet is micropleated to produce micropleats with a bending radius of about 0.01 inch and a depth of about 0.365 inch. As the micropleats are produced, a stream of thermoplastic melt adhesive is deposited on the upstream, (when in use), side in spaced straight lines perpendicular to the axes of the micropleats so as to solidify in a continuous strip connecting the peaks of the micropleats. In this way the micropleats are stabilized such that the sheet can be further manipulated without flattening or significantly distorting the configuration and the pleated sheet will be more resistant to distortion while in use. The hot melt stream is preferably applied in the same way also to the downstream face of the micropleated sheet.

The micropleated sheet is then passed over spaced heated wires to melt the strips of adhesive at intervals to allow the micropleated sheet to be formed into V-shaped macropleats with the macropleat axes generally parallel to the micropleated axes. The melted portion allows the micropleat at that point to be flexed and to form a peak, (or root depending on the side considered), of the macropleat. Parallel rows of macropleats are formed in the sheet and the micropleated and macropleated sheet is cut to a suitable shape.

This shape is then placed in a frame member and is preferably positively sealed along the edges to the frame by tape or by potting compound or other convenient means as desired so as to seal the filter against passage of air around, as opposed to through, the filter medium. The frame supplies edge support and added rigidity is provided on the outlet side of the filter by means of a plate that closes the outlet side except for slots that are located to correspond to the roots of the macropleats on that side. The ribs in the plate that define the slots are lipped inwardly to provide support means for locating the peaks of the macropleats and for holding the pleats open.

Figure 4:
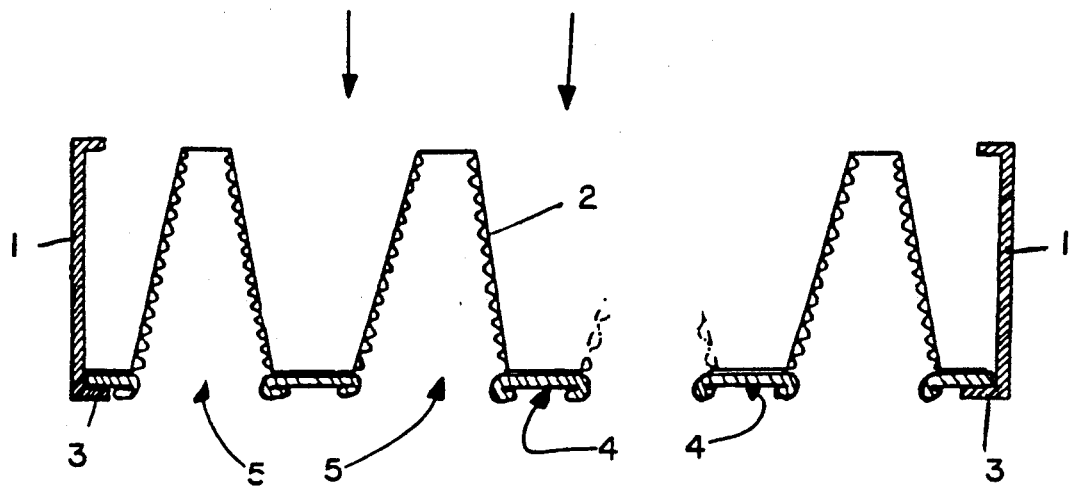
FIG. 4 is a diagrammatic cross-section of a filter according to the invention showing the micropleated filter sheet formed into V-shaped macropleats. In the drawing the air flow is from above and it will be noted that the width of the gap between the peaks of the macropleats on the side first contacting the air flow (inlet side) is greater than on the downstream side (outlet). This is, in fact, a preferred feature of the invention.
Figure 5:
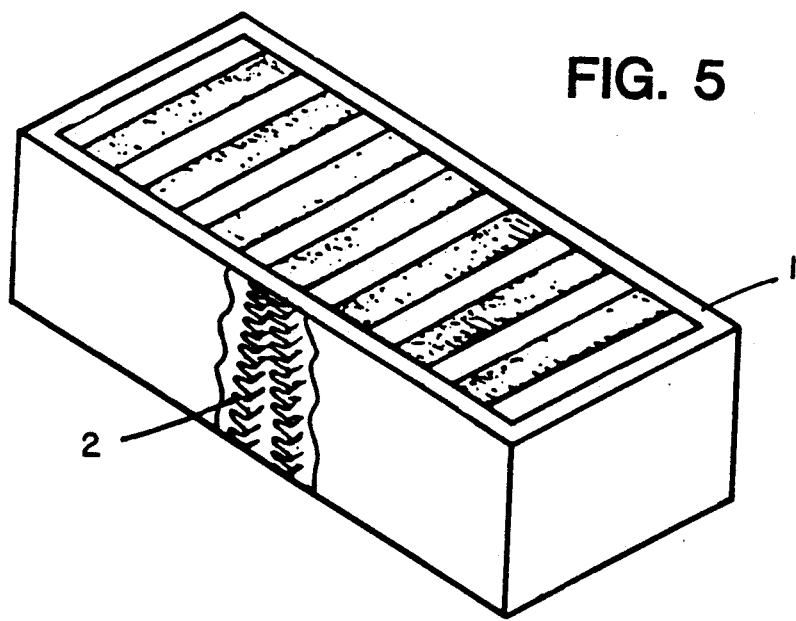

In the embodiment illustrated in FIG. 4, the rib support means and the macropleat separation are such that, as viewed from the inlet side, the width of the opening between the peaks of the macropleats is 1.5 times the width of the opening between corresponding peaks on the outlet side. This is found to increase significantly the dirt capacity of the filter before it is blinded and must be changed. This separation of the macropleats is not, however, an essential feature and the ratio of opening width on inlet to outlet sides can be from about 1:2 to 2:1 depending on the application or desired performance parameters. For example, if the prime objective is to minimize the pressure drop over the filter when it is first but in use (i.e., "clean pressure drop") the spacing can be symmetrical or it can be larger on the outlet side. This, however, will often lead to a reduction in service life.

The material from which the depth filter may be made is not usually critical, and polymeric fibers such as polyester, nylon, polypropylene, and other polyolefins may be used. In addition, inorganic fibers such as glass fiber or fibers having a UL-94 rating of V - 0, such as certain polyamides, are often desirable especially where there is concern over the flammability of components of the filter. A prime utility of the filter of the invention lies in aircraft cabin air filters and in such situations it is obviously highly desirable to use nonflammable glass fibers to construct the depth filter.

Filters designed for air purification should generally have an efficiency rating for 0.3 micron DOP aerosol of at least 90%, such as for example from 95 to 99.9% micron.

For many applications, such as cabin air filters, the filters should be as thin as possible consistent with the maintenance of strength and filtration efficiency standards so as to be able to maximize the number of micropleats per inch and therefore the available surface area for filtration. With very thin filters, however, it can be difficult to retain structural integrity during fabrication of the filter. For this reason, it is a preferred feature of the invention that the filter be supported on a thin porous web having independent structural integrity. Such webs can be woven or nonwoven and made of any suitable material. They should, however, be as thin as possible consistent with their assigned support role.

Preferred webs give rise to as little as possible, for example less than 10%, of the pressure drop across the combined structure. A particularly suitable web combines high tensile strength at low thickness and is made of non-flammable materials. Such a web is provided by continuous spun-bonded nylon filament materials commercially available under the registered trademark "Cerex".

The formation of micropleats in the depth filter sheet can be accomplished by conventional means such as passage between gear rolls or the use of reciprocating members operating on opposed faces of the sheet. The micropleats, as indicated above, generally have a depth of from about 10 to 100, such as 20 to 30 and preferably about 24 to 26 times the depth filter thickness. The thickness of the depth filter is from 0.01 to 0.03 inch and preferably 0.01 to 0.02 inch. Where a porous support web is used, the combined thickness should also fall within these ranges.

These shallow micropleats make the final structure more stable and resistant to collapse. They also permit more macropleats to be formed in the given length of the sheet because the pleats are less bulky than when deeper micropleats are used.

Shallow micropleats are preferred so as to shorten the length of the opposed sides of the micropleats which can, under pressure, deform by bowing outwards. This constricts the passages on the outlet side of the micropleats and leads to an increase in the pressure drop across the sheet. The shorter the length of these sides, the more resistant they are to deformation. However, it must be recognized that this shortening also reduces the available surface area of the filter so that the shortening should not be too great.

In a preferred filter of the invention having 4.5 micropleats to the inch in a supported depth filter sheet with a total thickness of 0.015 inch, the critical radius (and, therefore, the upper limit for the bending radius) was found to be about 0.01 inch. Generally, in preferred filter constructions according to the invention, the bending radius of the micropleats is less than about 0.015 inch, such as from 0.005 to 0.01 inch.

As described above, the stability of the micropleats is preferably assisted by deposition of a stream of a hot polymer melt applied in spaced strips perpendicular to the axes of the micropleats and along the peaks of the micropleats. The strips need not be wide or closely spaced to achieve this objective and generally strips about 0.06 to 0.1 inch wide and spaced about 2 inches apart are adequate, particularly if applied on both surfaces of the micropleated sheet.

The polymer melt used is not critical except that it should not be such as would disrupt the structure of the depth filter through chemical interaction or because of the melt temperature. For many uses a nonflammable polymer, such as a polyamide, is needed.

Once the micropleats have been formed in the depth filter sheet and preferably stabilized by the adhesive strips, the sheet is then formed into V-shaped macropleats. The macropleats can be as deep as the final dimensions of the filter frame into which the filter is to be placed may permit. Usually, however, the depth of the macropleats will be from about 3 inches to about 12 inches and preferably from about 4 inches to about 8 inches. The spacing between adjacent peaks of the macropleats will usually depend on the depth of the macropleats and will range from about 3 inches for deep pleats to less than one inch, such as from 0.2 to 0.8 inch, for shallower macropleats. The macropleats are formed along axes generally parallel to the axes of the micropleats.

Formation of the macropleats where a plurality of hot melt adhesive strips have been applied requires remelting of the strips at points at which the macropleat is to be formed. This allows the micropleat to be smoothed out at that point and shaped into the desired configuration. Generally, the macropleat peaks are flat and, in a preferred embodiment, of a width that depends on the surface on which they appear. On the surface that will provide the inlet surface when in use, the width is frequently less than in the opposed (outlet) surface. This results in a structure that is opened up somewhat on the inlet side and results in an increased dirt capacity. In general the width of the flat peak should be from 2 to 3 times the depth of the micropleats with the width of the peaks on the outlet side being preferably from 2.5 to 3 times the micropleat depth and those on the inlet side from 2 to 2.5 times the micropleat depth.

In use the micropleated and macropleated filter is conveniently retained in a frame member. In addition to being physically retained within the frame, it is preferred that the filter be sealed therein to prevent passage around, (as opposed to through), the filter medium.

To provide extra support for the filter, it is often preferred that there be a support member on at least the outlet face adapted to bear on at least a portion of the peaks of the macropleats on that face. In a particularly preferred embodiment, this support member is a plate located over the outlet of the filter frame and provided with slots and ribs corresponding respectively to the roots and peaks on that surface of the filter. In use, the ribs bear against the peaks on the outlet side of the filter and support the filter against any tendency to deform under the influence of any pressure surge.

The filters of the invention have a wide range of potential uses for filtration of liquid or gas streams. However, the key design features of low pressure drop, long life, elimination of the need for a pre-filter, and high dirt capacity, all in a compact structure, make them particularly adapted for use in filtering air in a non-industrial environment. This is particularly true of circumstances that require recirculation of air, such as in aircraft cabins. Use of the filters of the invention to purify recycled air in an aircraft cabin or other contained environment is therefore a preferred aspect of this invention.

What we claim is:

1. A filter assembly comprising a frame defining a flow path from inlet to outlet side and a filter disposed within said frame across the flow path, said filter being formed from a sheet of filter material having a thickness no greater than about 0.03 inch and formed into micropleats, and having at least one strip of adhesive material applied across the peaks of the micropleats and oriented at right angles to the axes of the micropleats, a said micropleated sheet defining macropleats with pleat axes generally parallel to those of the micropleats.

2. A filter assembly according to claim 1 in which at least one strip of adhesive material is applied to the peaks of the micropleats on both faces of the micropleated sheet.

3. A filter assembly according to claim 2 in which the adhesive material is a thermoplastic polymer.

4. A filter assembly according to claim 1 in which the sheet has a thickness of less than about 0.02 inch.

5. A filter assembly according to claim 4 in which the sheet is supported on a porous web material.

6. A filter assembly according to claim 5 in which the porous web is formed of a spun-bonded, continuous filament nylon.

7. A filter assembly according to claim 1 in which the sheet is formed from resin-impregnated glass fibers.

8. A filter assembly according to claim 1 in which the depth of the macropleats is at least eight times the depth of the micropleats.

9. A filter assembly comprising a frame defining a flow path from inlet to outlet side and, disposed, within said frame, a filter across the flow path, said filter comprising a sheet having a thickness no greater than about 0.03 inch and formed into micropleats having a bending radius of less than the critical radius and a micropleat depth to sheet thickness ratio of about from 10 to 100, said micropleated sheet defining macropleats with the axes of said macropleats substantially parallel to those of the micropleats.

10. A filter assembly according to claim 9 in which the sheet has a thickness of less than 0.02 inch.

11. A filter assembly according to claim 10 in which the depth filter sheet is supported on a porous web material.

12. A filter assembly according to claim 11 in which the porous web is formed of a spun-bonded, continuous filament nylon.

13. A filter assembly according to claim 9 in which the sheet is formed from resin-impregnated glass fibers.

14. A filter assembly according to claim 9 in which the depth of the macropleats is at least eight times the depth of the micropleats.

15. A filter assembly comprising a frame defining a flow path from inlet to outlet sides and disposed within said frame a filter across the flow path, said filter comprising a micropleated sheet formed of spun-bonded glass fibers supported on a porous web of spun-bonded nylon, said sheet having a thickness of from about 0.01 to 0.02 inch, and from 12 to 15 micropleats to the linear inch formed therein, said micropleats having a bending radius of less than about 0.01 inch and a ratio of the depth of the micropleats to the sheet thickness of from 20 to 30, said micropleated sheet defining macropleats with pleat axes generally parallel to the axes of the micropleats.

16. An air filter assembly comprising a frame defining a flow path from inlet to outlet sides and a filter disposed within said frame across the flow path, said filter comprising a sheet having a thickness no greater than about 0.03 inch and from 12 to 15 micropleats per linear inch, each micropleat having a bending radius of less than about 0.01 inch and a micropleat depth to sheet thickness ratio of from about 20 to 30, said micropleated sheet defining macropleats with pleat axes generally parallel to the axes of the micropleats.

17. An air filter assembly according to claim 16 having inlet and outlet sides wherein the distance between adjacent peaks of the macropleated sheets on the inlet side is from 0.5 to 2.0 times the corresponding spacing on the outlet side.

18. An air filter assembly according to claim 15 wherein at least one strip of adhesive material is applied across the peaks of the micropleats and oriented generally perpendicular to the axes of the micropleats.

19. An air filter assembly according to claim 18 wherein the adhesive material is a thermoplastic polymer and the strips are applied on both faces of the micropleated sheet.

20. An air filter assembly according to claim 16 wherein said sheet has a thickness of less than about 0.02 inch and is supported on a porous web.

21. An air filter assembly comprising a frame having a generally regular box shaped configuration with one dimension shorter than the other two, said shorter dimension being the direction of air flow through the filter assembly and, disposed within said frame, a composite sheet of a glass fiber filter with a thickness of less than about 0.02 inch supported upon a porous web of continuous nylon filaments, said composite sheet having from 12 to 15 micropleats per linear inch with the bending radius of the micropleats being less than 0.01 inch and the ratio of the depth of the micropleats to the sheet thickness being from about 20 to 30, and said micropleated sheet defining a macropleated structure with the axes of the macropleats being generally parallel to the axes of the micropleats.

22. An air filter assembly according to claim 21 having inlet and outlet sides in which the distance between adjacent peaks of the macropleats on the inlet side is from 0.5 to 2.0 times the corresponding opening on the outlet side.

23. A method of filtering airplane cabin air which comprises passing the air through a filter according to claim 1.

24. A method of filtering airplane cabin air which comprises passing the air through a filter according to claim 9.

25. A method of filtering airplane cabin air which comprises passing the air through a filter according to claim 15.

26. A method of filtering airplane cabin air which comprises passing the air through a filter according to claim 16.

27. A method of filtering airplane cabin air which comprises passing the air through an air filter according to claim 18.

28. A method of filtering airplane cabin air which comprises passing the air through an air filter according to claim 21.

29. A method of filtering airplane cabin air which comprises passing the air through an air filter according to claim 22.

30. A filter assembly for removing particulate matter from a gas, the filter assembly comprising a frame including an inlet, an outlet, and an impervious side wall defining a gas flow path between the inlet and the outlet; a filter means disposed across the gas flow path within the frame and including edges sealed against the side wall of the frame, the filter being formed into micropleats having peaks and axes, the axes extending generally parallel to the peaks, and further formed into macropleats having V-shaped configurations and axes generally parallel to the axes of the micropleats; and a plurality of strips of adhesive material extending across the peaks of the micropleats and generally oriented at right angles to the axes of the micropleats.

31. A filter assembly comprising a frame defining a flow path from inlet to outlet side, and a filter disposed within said frame across the flow path, said filter comprising a sheet having micropleats, and the micropleated sheet defining macropleats, wherein the bending radius of said micropleats is less than the critical radius.

32. The filter assembly according to claim 31 wherein said micropleats have at least one strip of adhesive material applied across the peaks of said micropleats.

33. The filter assembly according to claim 31 wherein said macropleats have pleat axes generally parallel to those of said micropleats.

34. The filter assembly according to claim 31 wherein the critical radius is between about 0.01 inch and about 0.015 inch.

35. A filter assembly comprising a frame defining a flow path from inlet to outlet side and a filter disposed within said frame across the flow path, said filter being formed from a sheet of filter material and formed into micropleats, and having at least one strip of adhesive material applied across the peaks of the micropleats, said micropleated sheet defining macropleats.

* * * * *

UNITED STATES PATENT AND TRADEMARK OFFICE
CERTIFICATE OF CORRECTION

PATENT NO. : 5,098,767

DATED : MARCH 24, 1992

INVENTOR(S) : STAFFAN B. LINNERSTEN

It is certified that error appears in the above-identified patent and that said Letters Patent is hereby corrected as shown below:

Claim 1, column 10, line 58, delete "a".

Claim 9, column 11, line 12, delete "," (second occurrence);

Claim 30, column 12, line 52, after "filter" delete --means--.

Signed and Sealed this

Twenty-second Day of June, 1993

Attest:

MICHAEL K. KIRK

*Attesting Officer*   Acting Commissioner of Patents and Trademarks